United States Patent [19]

Langdon

[11] 4,355,250
[45] Oct. 19, 1982

[54] SELF-ALIGNING BEARING ASSEMBLY
[75] Inventor: Robert S. Langdon, Fort Wayne, Ind.
[73] Assignee: General Electric Company, Fort Wayne, Ind.
[21] Appl. No.: 169,824
[22] Filed: Jul. 17, 1980
[51] Int. Cl.[3] ............................................. H02K 5/16
[52] U.S. Cl. ........................................ 310/88; 310/90; 308/132
[58] Field of Search ..................... 310/88, 90; 308/132

[56] References Cited
U.S. PATENT DOCUMENTS

| | | | |
|---|---|---|---|
| 3,164,422 | 1/1965 | Shaffer et al. | 308/132 |
| 3,793,543 | 2/1974 | Stokke et al. | 310/90 |
| 3,832,582 | 8/1974 | McDonald et al. | 310/90 |
| 3,885,176 | 5/1975 | Cunningham | 310/88 |
| 4,055,370 | 10/1977 | Cunningham | 310/90 X |
| 4,074,158 | 2/1978 | Cole | 310/90 |
| 4,198,584 | 4/1980 | Otto | 310/90 |

Primary Examiner—Donovan F. Duggan
Attorney, Agent, or Firm—Joseph E. Papin

[57] ABSTRACT

A self-aligning bearing assembly includes a bearing sleeve having a spherical outer contour supported at one side of the equator thereof by a plurality of arms having spherically concave ends making intimate contact with the spherical outer contour. A retaining member engages the spherical outer contour at the other side of the equator to secure the bearing sleeve against linear displacement but to permit angular adjustment about the center of the spherical outer contour. A wick member having fingers fitting into windows in the bearing sleeve conducts a lubricant such as oil to the tangential surface of a shaft. A reservoir containing an absorbent material having a lubricant absorbed therein and available therefrom surrounds the bearing sleeve with the absorbent material in contact with the wick member. Lubricant flingers or oil throwers or oil slingers spaced from each end of the bearing sleeve throw lubricant escaping past the ends of the bearing sleeve into rings of absorbent material such as felt from where the lubricant is transported to, and reabsorbed into, the reservoir and thus is made available for reuse. A relatively large intimate surface contact between the ends of the arms and the spherical outer contour permits rapid conduction of heat away from the bearing sleeve.

5 Claims, 2 Drawing Figures

SELF-ALIGNING BEARING ASSEMBLY

FIELD OF THE INVENTION

The invention relates generally to shaft bearings for rotating shafts and, more particularly, to a simple self-aligning shaft bearings having a mininum number of parts for dynamoelectric machines such as small and fractional horsepower electric motors.

BACKGROUND OF THE INVENTION

In small dynamoelectric machines, such as fractional horsepower electric motors, it is conventional to journal a rotating shaft in one or more sleeve-type bearings of a bearing assembly. Besides the sleeve-type bearings, such bearing assemblies conventionally include a lubricant reservoir containing an absorbent material such as wool felt or extrudable material of the type disclosed in Whitt U.S. Pat. No. 3,894,956, means such as a felt wick for depositing a film of lubricant on the shaft within the sleeve-type bearing and means for recirculating the lubricant which escapes along the bearing journal back to the reservoir for reuse. Such a lubricant supply and recirculation apparatus is shown, for example, in Cunningham U.S. Pat. No. 3,885,176. Stokke et al. U.S. Pat. No. 3,793,543 defines the parameters of a lubricant recirculation system to minimize loss of lubricant from the system.

For many applications, it is desirable that the bearing assembly be tolerant of angular misalignment of the shaft and the sleeve-type bearing. In Shaffer et al. U.S. Pat. No. 3,164,422, a sleeve-type bearing is formed with a generally hemispherical outer surface at one end thereof which is adapted to be assembled into a similarly shaped concavity in an end cover of a dynamoelectric machine. The Shaffer et al. device employs a large number of parts. The large number of parts increases assembly labor and the necessity to assemble the bearing assembly into the end cover of the dynamoelectric machine prevents efficient subassembly of the bearing assembly for later insertion into the dynamoelectric machine.

A shaft rotating in a sleeve-type bearing theoretically touches the bearing only along a line of contact which is determined by the direction of load application and the direction of shaft rotation. When a lubricant such as oil is introduced into the sleeve-type bearing it tends to separate the rotating shaft from the stationary bearing sleeve. At some value of shaft speed, dependent on bearing area, lubricant temperature and applied load, conveniently, for example, at a speed of 900 rpm, the lubricant develops a hydrodynamic film upon which the rotating shaft is supported away from the bearing sleeve.

In a self-aligning bearing, the bearing sleeve must be left free for angular adjustment. This freedom is provided in the Shaffer et al. patent, for example, by sliding contact between the hemispherical end surface of the bearing sleeve and the mating shape in the end cover of the dynamoelectric machine as well as by leaving the other end of the bearing sleeve without rigid contact with the structure. Such contact over only part of the surface of a bearing sleeve is less effective for conducting heat from the bearing than is the more usual intimate contact achieved by press fitting or integral manufacture. There is thus a tendency for the lubricant temperature to be higher in such a self-aligning bearing. If the lubricant temperature becomes too high, the hydrodynamic film set up by the rotating shaft may break down to thus permit the generation of additional heat. If this happens, the additional heat further interferes with adequate lubrication and this process can continue until the equipment fails.

SUMMARY OF THE INVENTION

It is a general object of the present invention to provide an improved self-aligning bearing for supporting a rotating shaft.

Another more specific object of the invention is to provide a self-aligning bearing for supporting a rotating shaft of a dynamoelectric machine.

Yet another object of the invention is to provide a self-aligning bearing requiring a minimum of parts.

A still further object of the invention is to provide a self-aligning bearing which includes effective means for transferring heat away from a sleeve-type bearing.

A further object of the invention is to provide a self-aligning bearing subassembly which can be assembled as a unit into the end cover of a dynamoelectric machine.

Throughout the disclosure herein, the words lubricant and oil should be considered synonymous. Also, the phrases oil or lubricant thrower, flinger or slinger are used interchangeably.

In carrying out the objects in one form, an annular housing of a bearing assembly has a plurality of short thick inward-directed arms each of which has a part-spherical concavity in the inner end thereof adapted to contact the spherical outer surface of a bearing sleeve at one side of the equator thereof. A star spring having a ring with a center opening therein is clamped in the housing with the ring in contact with the other hemisphere of the spherical surface to urge the first-mentioned hemisphere into intimate contact with the part-spherical ends of the arms.

A recirculating lubricant system including oil slingers on the shaft at each end of the bearing sleeve, collecting rings of absorbent material surrounding the oil slingers and effective to absorb oil thrown onto them from the oil slingers, a lubricant reservoir containing absorbent material effective to receive and store oil returned to it by the collecting rings and a wick member for conveying lubricant from the reservoir to the rotating shaft is included in the bearing assembly.

The bearing assembly, contained in an annular, housing may be produced as a subassembly for press fitting or other installation into the end cover of a dynamoelectric machine.

According to an aspect of the invention, there is provided a self-aligning shaft bearing comprising a bearing sleeve having a cylindrical bore therethrough adapted for rotatably supporting a shaft therein, a generally spherical outer surface on the bearing sleeve, a housing surrounding and spaced from the bearing sleeve, angularly spaced-apart, inward-directed arms integral with the housing and contacting the spherical outer surface at spaced-apart locations on a first side of an equator of the spherical outer surface, the arms having part-spherical ends thereon adapted for conforming contact with the spherical outer surface, means contacting locations on a second side of the equator for urging the spherical outer surface into contact with the part-spherical ends of the arm, means for applying a lubricant to a shaft rotating in the cylindrical bore, and means for recirculating the lubricant.

The subject matter which I regard as my invention is particularly pointed out and distinctly claimed in the concluding portion of this specification. My invention itself, however, both as to organization and method of operation, together with further objects and advantages thereof, may best be understood by reference to the following description taken in conjunction with the accompanying drawings.

DETAILED DESCRIPTION OF THE PREFERRED EMBODIMENT

Figures 1, 2:
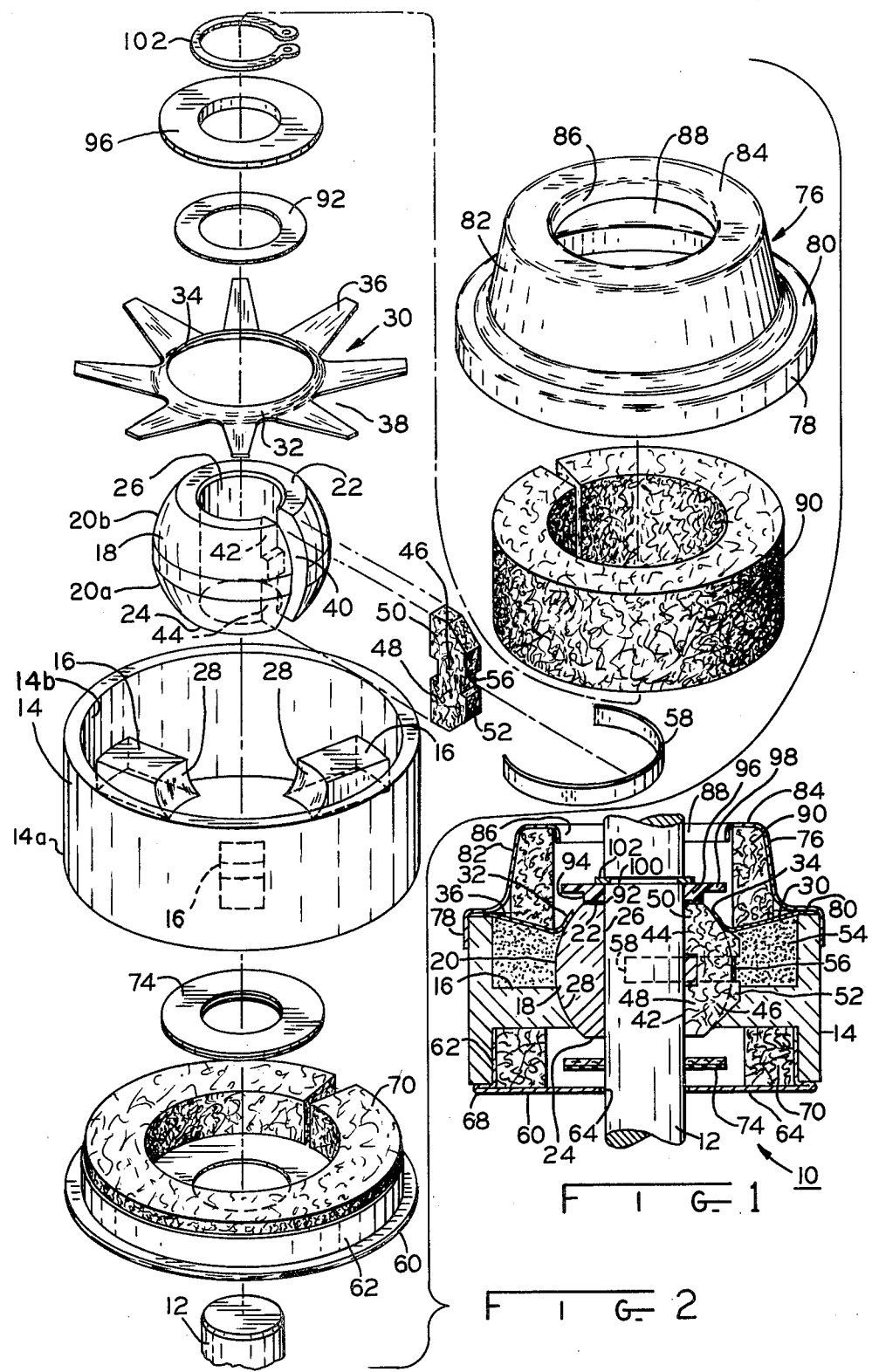
FIG. 1 is a cross-sectional view of a bearing assembly embodying one form of the invention.
FIG. 2 is a perspective exploded view of the bearing assembly seen in FIG. 1.

Referring to FIG. 1, a self-aligning shaft bearing assembly is shown generally at 10 for supporting and supplying lubricant to a shaft 12. Bearing assembly 10 is especially adapted for use with shaft 12 in a horizontal position. Shaft bearing assembly 10 may be included as part of a dynamoelectric machine (not shown). As best seen in FIG. 2, a generally annular housing 14, preferably of aluminum and most preferably of die cast aluminum, includes a pair of generally cylindric and radially spaced apart inner and outer surfaces 14a, 14b with inner surface 14b defining a generally axial opening through the housing, and; a plurality, and preferably three, of integral generally inwardly or radially directed arms 16 are generally equally and angularly spaced about the inner surface of annular housing 14 being integrally formed therewith.

A self-aligning bearing or bearing sleeve 18 centered within annular housing 14 has a spherical outer surface or peripheral portion 20 comprising a pair of opposite partial spherical surfaces 20a, 20b with opposite partial spherical surface 20b being truncated by an outer plane or end surface 22 at one end (the upper end in FIGS. 1 and 2). In the preferred embodiment, opposite partial spherical surface 20a may also be truncated by an inner plane or end surface 24. A flattened equator or intermediate surface 25 of spherical outer surface 20 is interposed between opposite partial spherical surfaces 20a, 20b and disposed midway between plane surfaces 22 and 24. A cylindrical bore 26 passes generally axially or concentrically through bearing 18 between outer and inner plane surfaces 22 and 24.

Bearing sleeve 18 may be of any convenient material but is preferably of aluminum. Shaft 12 passes completely through, and is rotatably supported in, cylindrical bore 26.

Inner ends 28 of arms 16 engage partial spherical surface 20a below equator 25 to thus support bearing sleeve 18 against downward displacement in FIG. 1. (Such downward direction will be understood to mean inward in a device 1 having a horizontal shaft.)

A star spring or spring means 30 includes an inner ring 32 having a partial-spherical contour or surface 32a which embraces partial spherical surface 20b above or equator 25. A center or generally central opening 34 in star spring 30 has a diameter substantially larger than the diameter of outer plane surface 22. Arms or resilient fingers 36 of star spring 30 are spaced apart to provide triangular-shaped openings 38 (FIG. 2) therebetween. Star spring 30 is of any suitable resilient material but is preferably of phosphor bronze.

A slot or slot means, such as a generally C-shaped cutout 40 or the like for instance in the side of bearing 18 provides two windows 42 and 44 into cylindrical bore 26, and slot 40 respectively intersects opposite ends 22, 24 and spherical outer surface 20 of the bearing. A lubricant feeder wick, such as C-shaped wick member 46 or the like for instance, which may be of any convenient material such as wool felt, has first and second arms 48 and 50 which fit into windows 42 and 44 and bear in lubricant wiping engagement against shaft 12. An outer end 52 of C-shaped wick member 46 preferably extends beyond spherical outer surface 20.

An oil reservoir 54 is filled with an oil absorbent material, shown stippled in FIG. 1. The oil absorbent material may be felt wicking packed into oil reservoir 54 but is preferably an extrudable lubricant retaining and wicking material such as diclosed in Whitt U.S. Patent No. 3,894,956, the disclosure of which is herein incorporated by reference.

The oil absorbent material in oil reservoir 54 should contain a supply of oil. Satisfactory performance may be obtained using an oil available from E. F. Houghton & Co. identified as "Cindol #1724". If bearing sleeve 18 is aluminum, additives may be added to the oil especially adapted to such use. For a long life such as, for example, 20 years, the oil should include an adequate oxidation inhibitor.

If felt wicking is used in oil reservoir 54, such felt wicking presses in lubricant transfer engagement against outer end 52 of C-shaped wick member 46 to thus hold C-shaped wick member 46 in the position shown in FIG. 1 with arms 42 and 44 in contact with shaft 12. However, if extrudable lubricant retaining and wicking material, such as disclosed in the Whitt patent, is employed in oil reservoir 54, other means are preferably provided for securely retaining C-shaped wick member 46 in position. In the preferred embodiment shown in FIGS. 1 and 2, a notch 56 in outer end 52 engages a resilient means, such as a spring clip or semi-circular spring 58 or the like for instance, in dashed line in FIG. 1 and in solid line in FIG. 2. Semi-circular spring 58 extends about at least a major portion of bearing 18 and embraces flattened equator 25 of bearing sleeve 18 in releasable or gripping engagement therewith to thus hold C-shaped wick member 46 securely in place against displacement from slot 40.

It will be noted in FIG. 1 that outer end 52 of C-shaped wick member 46 extends into, and is surrounded by, the oil absorbent material in oil reservoir 54. Oil in oil reservoir 54 is thus communicated to outer end 52 from whence it is wicked to arms 48 and 50 and then deposited in a film on shaft 12 as shaft 12 rotates past windows 42 and 44.

An inner end cover 60 includes an annular flange 62 and a circular end plate 64 with a circular hole 66 centrally disposed therein adapted for the passage therethrough of shaft 12. A lip 68 extends outward beyond annular flange 62 but has an overall diameter which is less than the diameter of housing 14. A ring of absorbent material 70 is fitted within annular flange 62 and has a thickness which extends beyond annular flange 62 into contact with the oil absorbent material in oil reservoir 54 (FIG. 1). Annular flange 62 is press fitted into housing 14 with lip 68 in abutment with an end 72 of housing 14.

A lubricant slinging means, such as an oil slinger 74 or the like for instance is disposed on shaft 12 so as to rotate generally conjointly therewith and is approximately centered in ring 70. Oil slinger 74 is preferably a disc of a laminate of synthetic rubber, such as Buna-N, and a paper phenolic material press fitted onto shaft 12. The outside diameter of oil slinger 74 is large enough to provide a peripheral velocity sufficient to throw droplets of oil therefrom onto ring 70 at the speed of shaft 12 such as, for example, 30 inches per second. Oil which escapes from bearing sleeve 18 along shaft 12 and thrown onto ring 70 is wicked back into the absorbent material in oil reservoir 54 for reuse. If shaft 12 were disposed vertically, oil would drip past oil slinger 74 after shaft 12 was stopped and would be lost to the system. Such oil loss can be prevented in known ways such as those disclosed in Stokke et al. U.S. Pat. No. 3,793,543 and Cunningham U.S. Pat. No 3,885,176.

An end bell 76 includes an annular flange 78 adapted for press fitting over the outside of housing 14 and a radially inward-directed portion 80 joining annular flange 78. An inward sloping portion 82 of end bell 76 joins the inward extremity of radially directed portion 80 and terminates in a second radially inward-directed portion 84. A turned lip 86 at the inner extremity of second radially directed portion 84 defines an opening 88 to permit the passage of shaft 12 therethrough. Turned lip 86, second radial inward-directed portion 84 and the adjacent portion of inward sloping portion 82 are seen to form a generally U-shaped section.

A ring of absorbent material 90 has one end engaged in the U-shaped section and its other end pressed against the outside surface of star spring 30.

In the unstressed condition of star spring 30, shown in FIG. 2, arms 36 extend upwardly substantially further than in their assembled stressed condition shown in FIG. 1. During assembly of bearing assembly 10 to form the structure of FIG. 1, the ends of arms 36 are pressed or otherwise biased by radially inward-directed portion 80 of end bell 76 against the resilience of the material of star spring 30 until the ends of arms 36 are clamped or otherwise engaged or seated between radially inward-directed portion 80 and the end of housing 14. A sealing material (not shown) may be employed between radially inward-directed portion 80 and the mating end of housing 14.

It will be seen that, in the assembled condition of FIG. 1, ring 90 is pressed downwardly firmly against the outer surface of star spring 30. This forces the absorbent material in ring 90 into intimate contact with the oil absorbent material in oil reservoir 54 through triangular-shaped openings 38 (FIG. 2). The inward slope of inward sloping portion 82 tends to urge ring 90 further toward star spring 30 and to thus enhance the contact between ring 90 and absorbent material in oil reservoir 54. In addition, when in the horizontal position, the inward slope of portion 82 provides a downward slope toward oil reservoir 54 to help convey oil from ring 90 toward oil reservoir 54.

A thrust transferring means, such as a thrust bearing 92 or the like for instance, is disposed between a smaller diameter portion 94 of a lubricant slinging means, such as an oil slinger 96 or the like for instance, and upper plane surface 22 of bearing sleeve 18. A larger diameter portion 98 of oil slinger 96 has a diameter sufficient to provide a peripheral velocity which is effective to throw or sling droplets of oil or lubricant outward therefrom at the normal rotation rate of shaft 12.

The axial lengths of smaller diameter portion 94 and larger diameter portion 98 as well as the diameters of these portions 94,98 are preferably in accordance with the preferred dimensions in Stokke et al. U.S. Pat. No. 3,793,543, the disclosure of which is herein incorporated by reference. Specifically, the Stokke et al. patent discloses dimensions which enhance the recovery of oil.

Thrust bearing 92 is preferably of flat spring steel and another lubricant slinging means, such as an oil slinger 96 or the like for instance, is preferably of a self-lubricating material such as Nylatron which is a nylon molybdenum disulphide composition available from Polymer Corporation.

For relatively small thrust loads such as, for example, up to about 2 Kg, thrust bearing 92 and oil slinger 96 may be separately assembled parts. For higher loads, thrust bearing 92 and oil slinger 96 should be locked together.

An annular groove 100 in shaft 12 is fitted with a retaining ring 102 for applying thrust loads through oil slinger 96 and thrust bearing 92. A suitable shaft shoulder or shrunk on collar (not shown) may be substituted for annular groove 100 and retaining ring 102.

As is well known in the art, if felt-type absorbent material is used in oil reservoir 54, it is preferably of lower density than oil collecting rings 70 and 90 to encourage migration of the oil from rings 70 and 90 to oil reservoir 54.

In the assembled condition shown in FIG. 1, under the condition of no thrust load axially inward (downward in FIG. 1) along shaft 12, the inward force provided by the resilience of star spring 30 holds outer surface 20 of bearing sleeve 18 firmly in contact with the partial spherical concave inner ends of arms 16. Thus, heat in bearing sleeve 18 is readily transmitted through the relatively short high capacity thermal flow path of arms 16 to the annular outer portion of housing 14. When thrust loading is applied in the inward direction to shaft 12, the contact between circular outer surface 20 and the concave ends of arms 16 is enhanced by the extra force applied therebetween and provides even greater thermal transmission capacity.

As will be evident from the assembled bearing assembly 10 in FIG. 1, the cylindrical body of housing 14 may be press fitted into a cylindrical opening (not shown) such as in the end cover of a dynamoelectric machine, wherein it may act as one of the bearings of the dynamoelectric machine. Heat from bearing sleeve 18 transmitted along arms 16 of housing 14 may be communicated to the end cover (not shown) in which it is installed from whence it may be dissipated by conduction or convection. The use of aluminum in bearing sleeve 18 and housing 14 enhances such heat conduction. The freedom of bearing sleeve 18 to rotate about the center of spherical outer surface 20 accommodates angular misalignment between shaft 12 and bearing assembly 10.

The simplicity of bearing assembly 10 should now be clear. Except for the lubrication system, thrust transmission and end covers, the bearing functions are accomplished with only four parts. That is, housing 14, bearing sleeve 18, star spring 30 and thrust bearing 92. In addition, the close thermal coupling between bearing sleeve 18 and housing 14 permits good heat transfer away from cylindrical bore 26.

As previously mentioned, the bearing surface in cylindrical bore 26 should be related to the shaft speed, temperature and load for which bearing assembly 10 is designed. With sufficient area, the oil forms a hydrodynamic film which separates shaft 12 from cylindrical bore 26 when shaft 12 rotates at, for example, 900 rpm. For an 8 mm shaft bearing, for example, cylindrical bore 26 may have a diameter of from about 8.011 to about 8.019 mm and a length of from about 12.83 to about 12.57 mm. Windows 42 and 44 may each be about 1.78 mm wide by from about 4.7 to about 4.9 mm high. The spherical diameter of spherical outer surface 20 may be from about 17.35 to about 17.45 mm. Suitable dimensions for other shaft diameters would be clear to one skilled in the art in view of the foregoing disclosures.

It should also be recognized from the above description that the self-aligning bearing assembly may have utility outside a dynamoelectric machine. In addition, although the preferred embodiment employs aluminum in housing 14 and bearing sleeve 18, other suitable materials may be substituted with appropriate changes in manufacturing tolerances.

While in accordance with the patent statute, I have described what at present is considered to be the preferred embodiment of my invention. It will be apparent to those skilled in the art that numerous changes and modifications may be made therein without departing from the invention and it is, therefore, intended that the appended claims cover all such equivalent variations as fall within the true spirit and scope of the invention.

What I claim as new and desire to secure by Letters Patent of the United States is:

1. A bearing assembly for journaling a rotatable shaft of a dynamoelectric machine comprising a self-aligning bearing having a bore therethrough adapted to rotatably journal the shaft therein; a pair of opposite partial spherical outer surfaces of like configuration on said bearing; a housing surrounding and generally radially spaced from said bearing; a plurality of angularly spaced-apart and generally radially extending arms integral with said housing and having partial spherical end surfaces thereon arranged in conforming contact with one of said opposite partial spherical outer surfaces of said bearing, respectively; spring means for urging said one opposite partial spherical outer surface on said bearing into the conforming contact with said partial spherical end surfaces on said arms, said spring means including means for biased engagement with said housing, and means for conforming contacting engagement with the other of said opposite partial spherical outer surfaces on said bearing so as to effect free self-alignment of said one opposite partial spherical outer surface of said bearing on said partial spherical end surfaces of said arms; and means disposed in said housing and said bearing for supplying a lubricant to the shaft in said bore of said bearing.

2. A self-aligning shaft bearing according to claim 1 wherein said dynamoelectric machine also has an end shield and wherein said housing includes an outer surface adapted to be associated at least in part in mounting engagement with the end shield of the dynamoelectric machine.

3. A self-aligning shaft bearing according to claim 1 wherein said bearing includes a slot therein intersecting with said opposite partial spherical outer surfaces and said bore, and said lubricant supplying means including a feeder wick member disposed in said slot in said bearing and having a portion extending at least adjacent said bore of said bearing adapted to wipe in lubricant transferring relation with the shaft and another portion extending at least in part beyond said opposite partial spherical outer surfaces, and lubricant storage material disposed at least in part within said housing and in lubricant transfer engagement with at least a part of said another portion of said feeder wick member.

4. For use in a dynamoelectric machine, a bearing assembly comprising a housing having an outer surface and an inner surface arranged generally in radially spaced relation and with said inner surface defining an opening through said housing; a plurality of arms integral with said inner surface of said housing and extending therefrom part way into said opening of said housing; a bearing having a cylindrical bore therethrough adapted for rotatably supporting a shaft of the dynamoelectric machine; a pair of opposite partial spherical outer surfaces on said bearing; a pair of opposite generally planar end surfaces on said bearing extending between said bore and said opposite partial spherical surfaces, respectively; a plurality of partial spherical concave ends on said arms adapted for conforming contact with one of said opposite partial spherical outer surfaces of said bearing; resilient means engaged between said housing and the other of said opposite partial spherical outer surfaces of said bearing so as to effect free self-aligning movement thereof and operable generally for urging said one opposite partial spherical outer surface of said bearing into free self-aligning movement with said partial spherical concave ends of said arms, respectively; at least one window in said cylindrical bore communicating with at least said opposite partial spherical outer surfaces of said bearing; a feeder wick member having a first end for contacting a shaft through said at least one window and a second end extending beyond said opposite partial spherical outer surfaces of said bearing; an oil reservoir including at least said housing opening and containing an oil storage wicking material in contact with said second end of said feeder wick member; first and second oil slingers on said shaft arranged at least adjacent said opposite end surfaces of said bearing and effective to radially throw oil escaping from said bore past said opposite end surfaces of said bearing, respectively; and said storage wicking material including first and second ring portions spaced from, and generally radially surrounding, said first and second oil slingers respectively and effective to absorb the radially thrown oil from said first and second oil slingers.

5. A bearing assembly for journaling a rotatable shaft in a dynamoelectric machine comprising:

a housing having a pair of generally radially spaced apart inner and outer surfaces with said inner surface defining an opening extending generally axially through said housing, said housing including a plurality of arms integrally formed with said inner surface and extending into said housing opening, respectively, and a plurality of free end portions defining partial spherical bearing seating surfaces on said housing arms, respectively;

a self-aligning bearing including a pair of opposite partial spherical surfaces defining at least in part a peripheral portion thereof and with one of said opposite partial spherical surfaces being seated in self-aligning bearing engagement on said free end portions of said housing arms, respectively, an intermediate surface on said bearing extending generally circumferentially thereabout and interposed between said opposite partial spherical surfaces of said bearing, respectively, a pair of opposite end surfaces on said bearing intersecting with said opposite partial spherical surfaces thereof, respectively, a bore extending generally axially through said bearing intersecting with said opposite end surfaces thereof and adapted to rotatably journal said shaft of the dynamoelectric machine, and slot means in said bearing respectively intersecting with said opposite spherical surfaces, said intermediate surface, at least one of said opposite end surfaces and said bore thereof for defining at least one window in said bore;

a lubricant feeder wick disposed in said slot means of said bearing including a first portion arranged in lubricant wiping engagement with said shaft through said at least one window in said bearing, a second portion of said lubricant feeder wick extending from said slot means at least in part beyond said opposite partial spherical surfaces of said bearing, and a notch in said second portion of said feeder wick arranged generally in alignment with said intermediate surface on said bearing;

a spring extending generally circumferentially about at least a major part of said intermediate surface on said bearing in releasable engagement therewith and received in said notch in said second portion of said feeder wick so as to retain said feeder wick against displacement from said slot means in said bearing;

spring means for urging said one opposite partial spherical surface on said bearing into the self-aligning bearing engagement thereof with said free end portions of said housing arms, said spring means including another partial spherical surface defining a generally central opening through said spring means and seated in engagement with the other of said opposite partial spherical surfaces on said bearing, and a plurality of resilient fingers on said spring means extending generally radially of said central opening therethrough and associated with said housing so as to urge said another partial spherical surface on said spring means into the engagement thereof with said other opposite partial spherical surface on said bearing thereby to retain said one opposite spherical surface thereof against displacement from its self-aligning bearing engagement with said free end portions of said housing arms;

means including said housing for containing a lubricant storage wicking material therein in lubricant transfer relation with at least a part of said second portion of said feeder wick;

thrust bearing means on said shaft for engagement with one of said opposite end surfaces of said bearing; and a pair of means conjointly rotatably with said shaft and operable generally for slinging lubricant escaping from said bore of said bearing generally radially from said shaft so as to return the escaping lubricant to said lubricant storage wicking material in said containing means therefor, one of said slinging means being arranged on said shaft at least adjacent said thrust bearing means and the other of said slinging means being arranged on said shaft at least adjacent the other of said opposite end surfaces of said bearing.

* * * * *